United States Patent [19]

Funamo et al.

[11] 4,028,495

[45] June 7, 1977

[54] TIME DIVISION COMMUNICATION SYSTEM ADAPTED TO STRUCTURAL EXPANSION

[75] Inventors: Hiroshi Funamo; Toshiro Kunihiro; Masaaki Murai, all of Tokyo, Japan

[73] Assignee: Nippon Electric Company, Ltd., Tokyo, Japan

[22] Filed: Dec. 29, 1975

[21] Appl. No.: 645,069

[30] Foreign Application Priority Data

Dec. 30, 1974 Japan .............................. 50-1642

[52] U.S. Cl. ........................... 179/15 AT; 179/18 J
[51] Int. Cl.² ......................................... H04M 3/00
[58] Field of Search ........... 179/15 AT, 18 J, 18 ES

[56] References Cited

UNITED STATES PATENTS

| 3,403,383 | 9/1968 | Kienzle et al. | 179/15 AT |
| 3,517,123 | 6/1970 | Harr et al. | 179/18 ES |
| 3,787,633 | 1/1974 | Busch | 179/18 J |

Primary Examiner—Thomas A. Robinson
Attorney, Agent, or Firm—Sughrue, Rothwell, Mion, Zinn and Macpeak

[57] ABSTRACT

A time division communication system is constructed with modular time division switches. The system includes $2n$ switch modules ($n$ is a positive integer), and each switch module is composed of $m$ line control units ($m$ is a positive integer) for accomodating $m$ lines and a time division switch control unit capable of controlling $2m$ line control units. The switch modules are assembled in pairs, and cross connections are provided between the switch modules of each pair to enable the respective time division switch control units to mutually send and receive time-division multiplexed information. In addition, the input and output terminals of the corresponding time division switch control units of the respective switch module pairs are interconnected so that respective ones of the module pairs may mutually send and receive time-division multiplexed information.

3 Claims, 7 Drawing Figures

TIME DIVISION COMMUNICATION SYSTEM ADAPTED TO STRUCTURAL EXPANSION

BACKGROUND OF THE INVENTION:

The present invention relates to a time division communication system adapted to structural and capacity expansion, and more particularly, to a novel module construction of a time division switching equipment for use in a data exchange system.

A conventional time division switch for a data exchange system is constructed in such a manner that connection paths between lines are divided into a number of steps to store data in memories provided midway in the system, and by sending said data after waiting for an idle time of the forward connection path section after the connection between the lines is established. However, in such a system it is ncessary to centralize the time-division multiplexed information from the respective lines, and accordingly, there are disadvantages such as complexity of control, difficulty in structural expansion, relatively high cost in the case of small capacity.

SUMMARY OF THE INVENTION

The present invention provides, for the purpose of overcoming the aforementioned disadvantages in the prior art, a novel module construction of a time division switch, which is composed of switch module pairs each forming a unit in which time-division multiplexed informations are interconnected in every time slot so that data may be sent from an input line to an output line within one time slot without resorting to a memory interposed between the input and output lines, whereby the control of a time division switch and the expansion of the system as a whole are facilitated.

The time division communication system according to the present invention comprises $2n$ switch modules ($n$ is a positive integer), and each switch module is composed of $m$ line control units ($m$ is a positive integer) for accommodating $m$ lines and a time division switch control unit capable of controlling $2m$ line control units. The switch modules are connected as $n$ switch module pairs, and between the switch modules of said switch module pair are provided cross connections for enabling the respective time division switch control units to be switched over and make cross connection for enabling the respective switch modules to mutually send and receive time-division multiplexed information. The input and output terminals of the corresponding time division switch control units of the respective switch module pairs are interconnected so that the respective ones of said module pairs may mutually send and receive said time-division multiplexed information.

According to the above-described feature of the present invention, excellent effects can be achieved such that switch control becomes very simple, expansion of the system is extremely facilitated by stacking modules, and the manufacturing cost is markedly reduced even in the case of a small line capacity.

Figure 1:
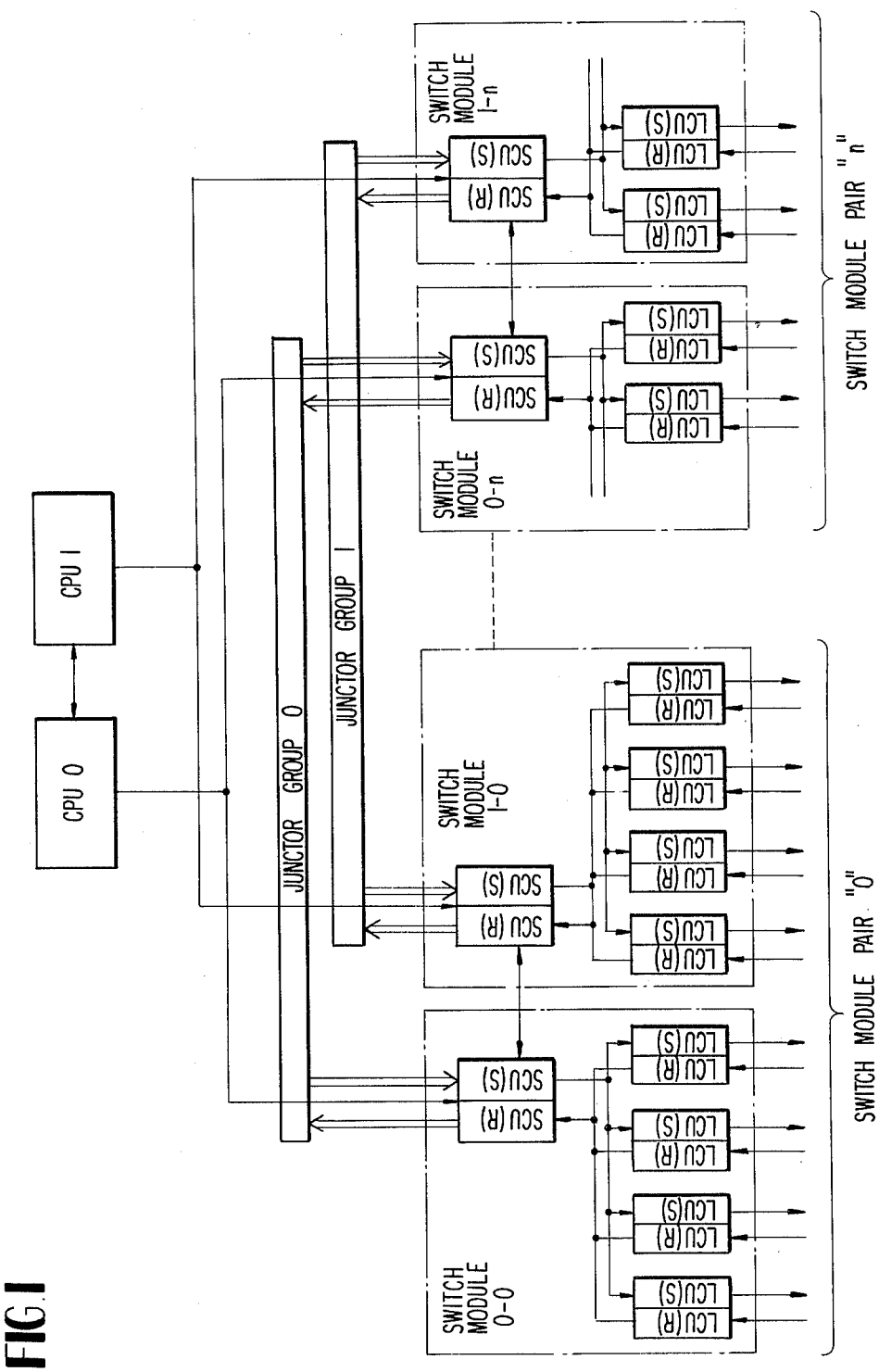
FIG. 1 is a block diagram showing one preferred embodiment of a time division switching system employing a switch module construction according to the present invention.

DESCRIPTION OF THE PREFERRED EMBODIMENTS:

FIG. 1 is a block diagram showing a system construction of one preferred embodiment of the data switching system employing a time division communication system according to the present invention.

This system is generally divided into a switch system and a central processing system. In the illustrated embodiment, the switch system is composed of $n$ switch module pairs. Each switch module pair consists of two switch modules, and each switch module comprises $m$ line control units (LCU) and one switch control unit (SCU). In the specific example shown, $m$ is four. The two switch modules in the same pair are interconnected so that necessary control information and time-divided multiplexed communication information may be mutually sent and received therebetween. The SCU provided in each switch module has such processing capability that if one SCU in a switch module pair should become faulty, the other SCU can control the switch module pair as a whole and therefore each SCU has the capability of controlling $2m$ LCUs. The SCU conducts line state supervision, dial signal reception, allot control for input line addresses and time slots, allot control for output line addresses and time slots, transmission control for service signals and repetition dial signals, and the like. In contrast, the LCU conducts time-division multiplexing of the input line state, the signal level conversion from input lines to switches, the signal level conversion from switches to output lines, the time-division multiplexing of communication data in accordance with line addresses received from the time division switch control unit in the respective time slots, the level regeneration of the time-division multiplexed data, the transmission of service signals and repetition dial signals, and the like. The switch module pairs are divided into 0-series and 1-series, and among the $n$ switch modules in each series is provided a junctor. In the central processing system, two central processing units (CPU 0, CPU 1) are interconnected so as to be accessible to every SCU.

Figure 2:
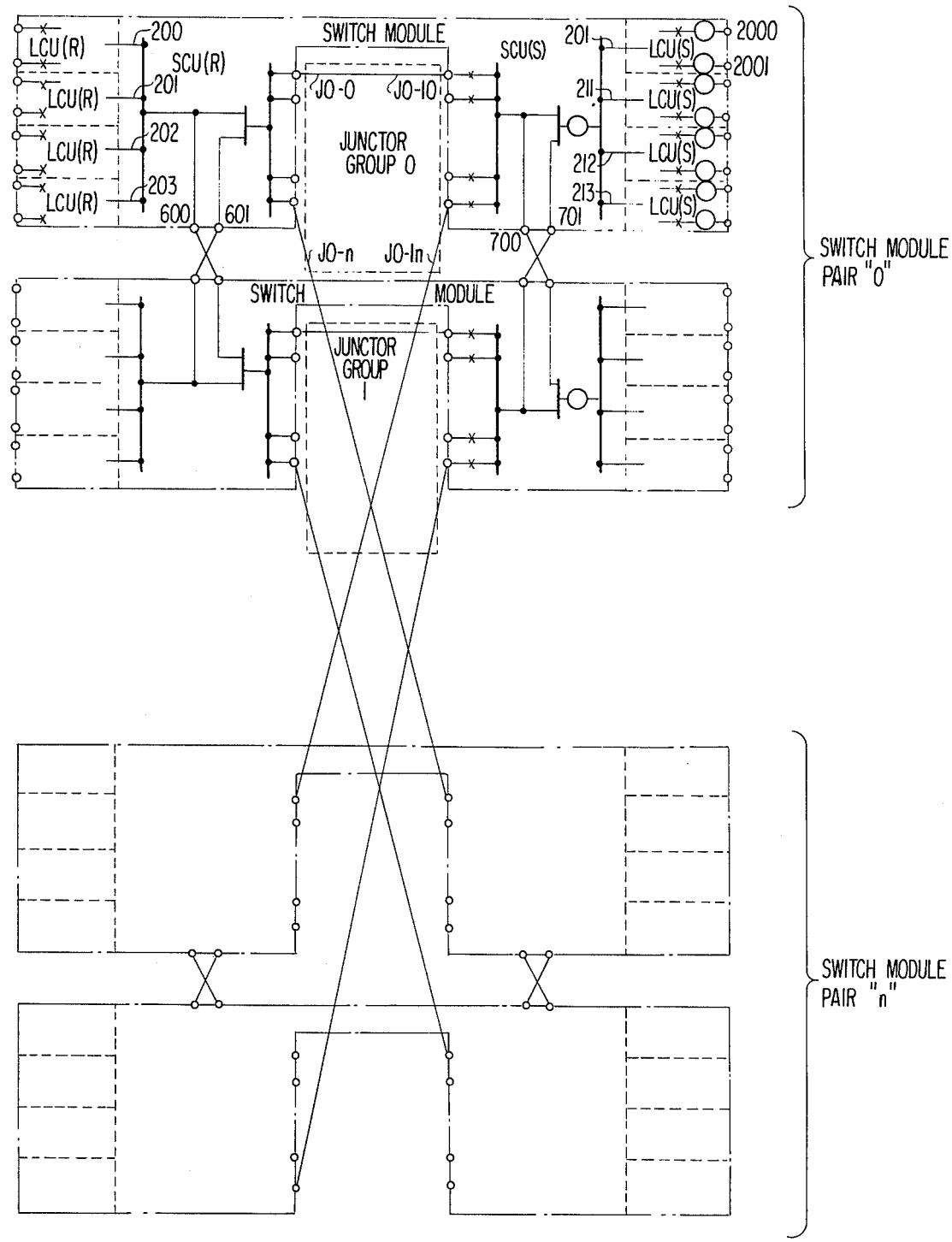
FIG. 2 is a schematic view showing one preferred embodiment of the switch module construction according to the present invention.

FIG. 2 shows a switch module construction in FIG. 1, and in this figure, especially, cross connection for the time-division multiplexed information and input and output paths only are illustrated, cross marks (x) in the figure indicating the portions where switching is conducted in every time slot.

Now the circuit constructions of the respective LCU and SCU which form constituent elements of the switch module, will be described with reference to FIGS. 3 and 4. At first, a receiving section of a line control unit LCU(R) shown in FIG. 3(a) will be explained. Input wires 1000 and 1001 are connected to signal level conversion circuits 20 and 21, respectively, and since a decoder 30 serves to fixedly allot line addresses to respective time slots, calling detection information, dial information and communication information are time-division multiplexed by gates 40 to 43 and then sent through lines 400 and 410 (in a two-wire system, through only line 410) to an SCU. In addition, a line address in every time slot is sent from the SCU through a line 300, so that said communication information is time-division multiplexed by means of a decoder 31 and gates 44 and 45, and then sent through a line 200 to a receiving section of a time division switch control unit SCU(R) as described later.

Now description will be made on a sending section of the line control unit LCU(S). Line addresses which are fixedly alloted to the respective time slots by decoders 33 and 34 and output line control information which is sent from the SCU(R) through lines 500 and 501 are logically operated on by gates 46 to 49 and transmitted to sending control circuits 22 or 23, so that service signals, repetition dial signals, etc. are sent out through output lines 2000 or 2001. In addition, line addresses for the respective time slots are sent through a line 310 from a sending section of a time division switch control unit SCU(S) as described later, so that time-division multiplexed information sent from the SCU(S) through a line 210 is set in a flip-flop 80 or 81 by means of a decoder 32 and gates 70 and 71. Communication information that has been regenerated by the flip-flop 80 or 81 is converted to line signal level by the sending control circuit 22 or 23 and is sent out through output lines 2000 and 2001.

Figure 4B:
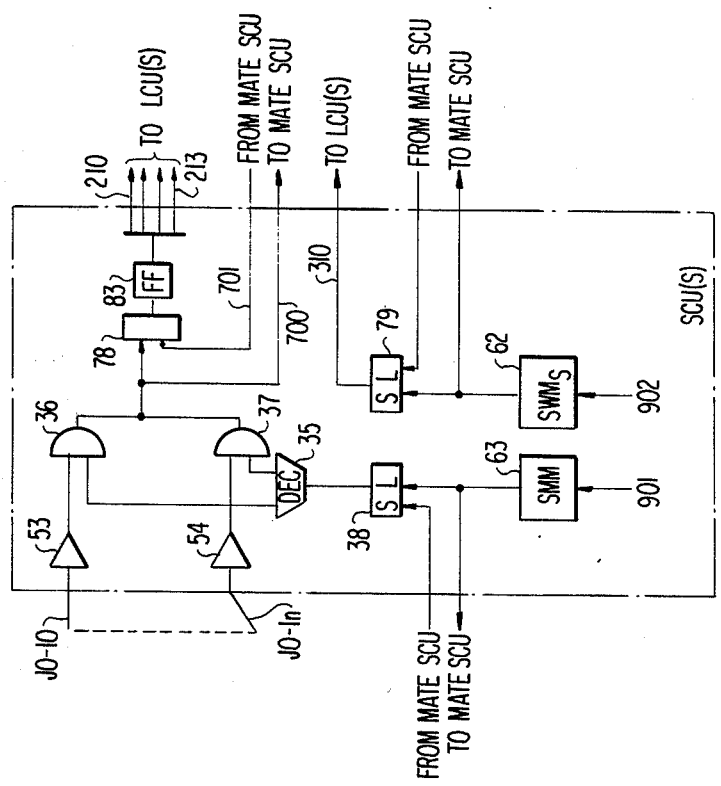
Figure 4A:
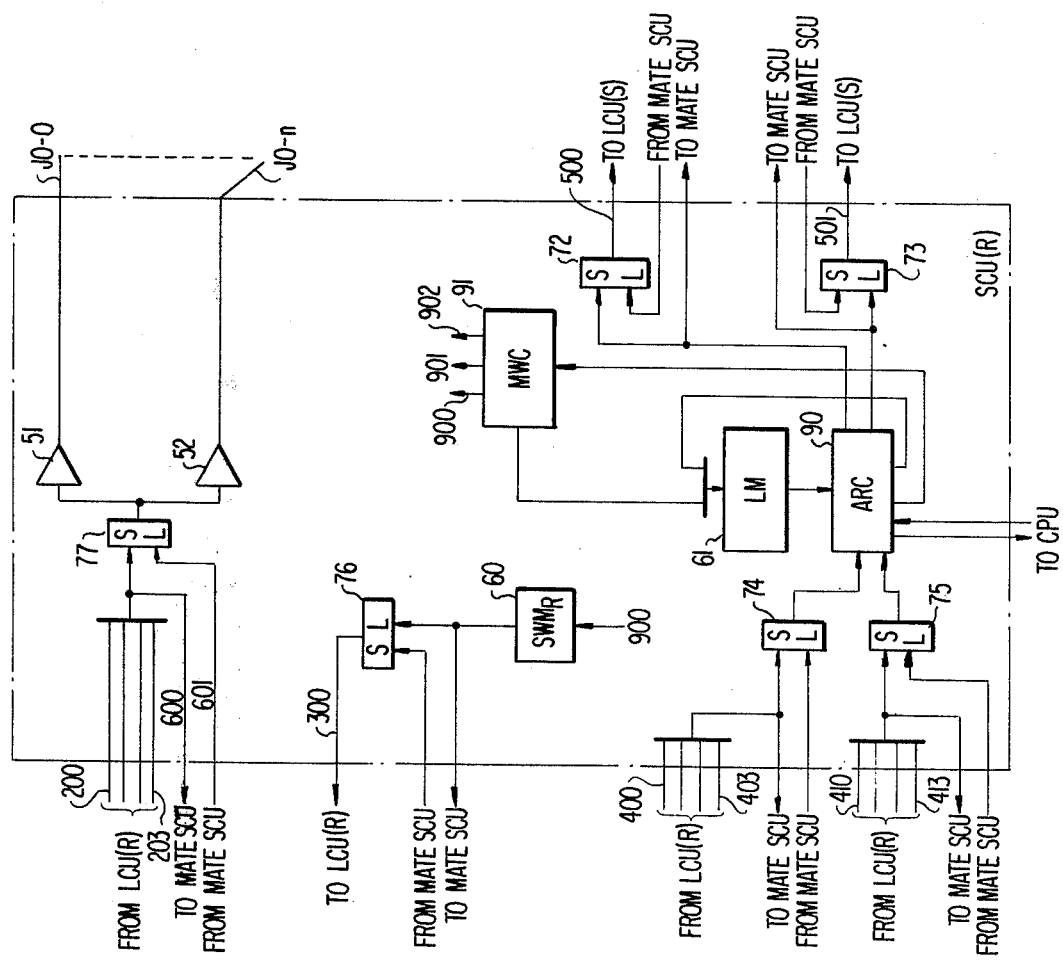

FIG. 4(a) shows a receiving section of a time division switch control unit SCU(R), in which the communication information on the lines 200 to 203 which were time-division multiplexed by said LCU(R) are simply joined because they are controlled so as not to overlap in every time slot, cross connection is made to a mate SCU, with which a switch module pair is formed through lines 600 and 601, and the information are selected by a selector 77, passed through drivers 51 and 52 and simultaneously sent out to its own switch module as well as the other switch modules through lines JO-0 to JO-n.

In addition, calling detection information and dial information on lines 400 to 403 and communication information on lines 410 to 413 (in a two-wire system, only lines 410 and 413) are respectively joined, controlled by selectors 74 and 75 with respect to transfer to and from a mate, and thus sent to an arithmetic control section 90. The arithmetic control section 90 has functions of editing line state information, dial information, etc., reporting the edited information to a central processing unit, and receiving a command from the central processing unit as well as line control information. In this arithmetic control section 90, memory contents read out from a memory 61 which stores state information of all lines and information sent from the selector 75 are compared to detect a calling state, and the dial information obtained from the selector 74 is stored in said memory 61. In addition, an output line control signal is sent to LCU(S) while its transfer to a mate is being controlled by selectors 72 and 73. In this figure, reference numeral 91 designates a write control section for memories 60 to 63 as described later. A switch module address is read out in every time slot. To accomplish this, there is provided a memory 60 for storing input line addresses (those of all input lines in a switch module pair), and selector 76 controls transfer to a mate SCU of the signal sent from the memory 60.

FIG. 4(b) shows a sending section of a time division switch control unit SCU(S), in which a switch module address in every time slot is designated by a decoder 35, so that the time-division multiplex information sent out from each switch module is selected by receivers 53 and 54 and gates 36 and 37, is cross-connected with a mate SCU through lines 700 and 701, and is selected by a selector 78 to be held in a flip-flop 83. The flip-flop 83 is provided for the purpose of absorbing signal delay caused by a driver, a receiver and a cable. Subsequently, this information is simultaneously sent out through lines 210 to 213 to a LCU(S) controlled by the SCU.

Memories 62 and 63 are memories for periodically reading out a line address or a switch module address in every time slot, and in each said memory are stored the output line addresses in said LCU(S) (those of all output lines in a switch module pair) and the switch module addresses. Also, selector 79 selectively supplies to the LCU(S) on line 310 as an address signal either the output from a mate SCU or that from memory 62. Similarly, selector 38 selectively supplies to decoder 35 either the output from a mate SCU or from memory 63.

Here, the switching operations of the time division switching system making use of one preferred embodiment of the invention constructed as described above, will be described.

Figure 3A:
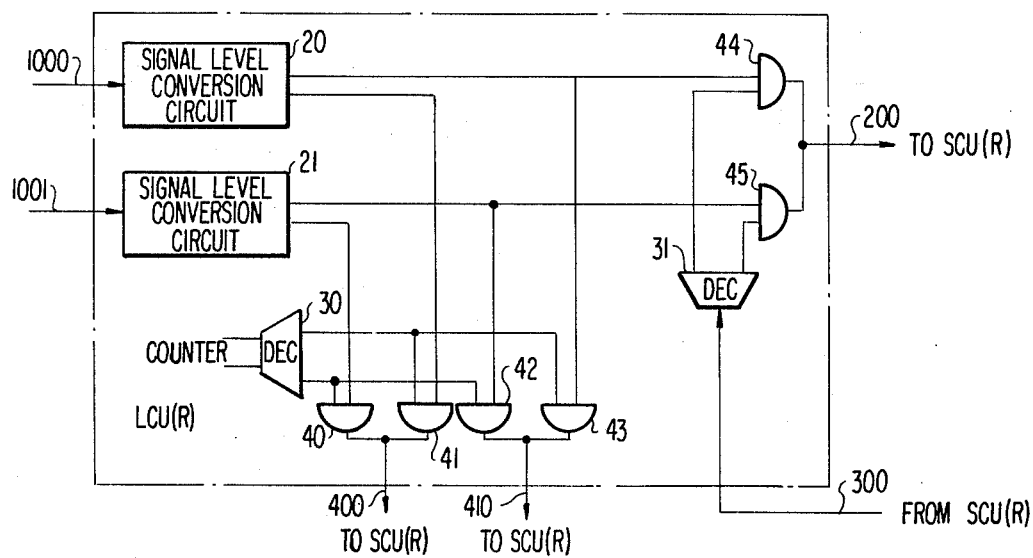
FIG. 3a and 3b are block diagrams showing one preferred embodiment of a construction of a line control unit, in which a receiving section of the line control unit is shown at FIG. 3a, while a sending section of the line control unit is shown at FIG. 3b, FIG. 4a and 4b are block diagrams showing one preferred embodiment of a construction of a time division switch control unit, in which a receiving section of the time division switch control unit is shown at 4a, while a sending section of the time division switch control unit is shown at 4b.
Figure 3B:
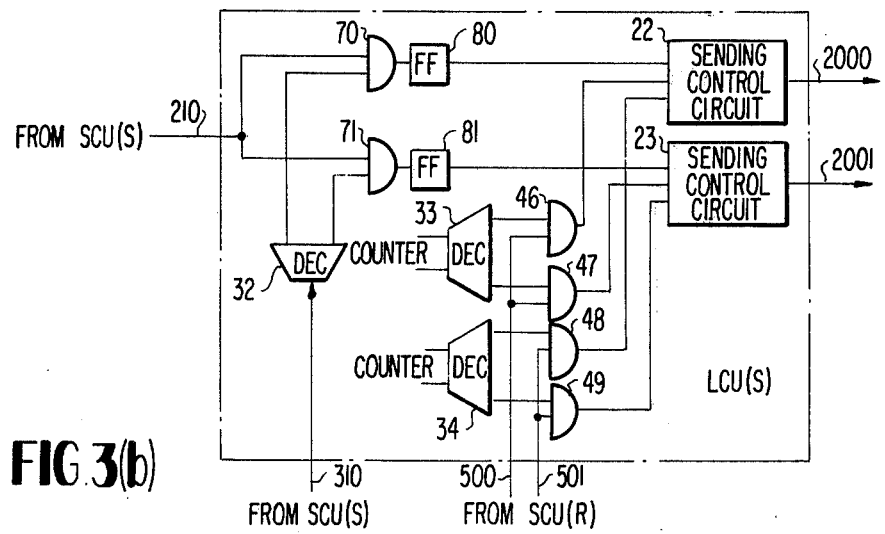

Communication demand from a terminal A is detected by comparing the scan data on the information line 400 in FIG. 3(a) to the scan results in the last time stored in the memory 61 by means of the arithmetic control section 90 in FIG. 4(a), and the dial information pertinent to said communication demand is obtained by subjecting the scan data or said information line 400 to editing in said arithmetic control section, and is transferred to a central processing unit.

In the central processing unit, an idle time slot is hunted according to such manner that the rate of block caused by the blocking of time slots may be minimized, a command is sent out that a line address and a switch module address should be written in the memories 60, 63 and 62 in FIGS. 4(a) and 4(b), and also when a terminal B responds to the call, another command is sent out so that terminal A is informed that communication has become possible.

Figure 5:
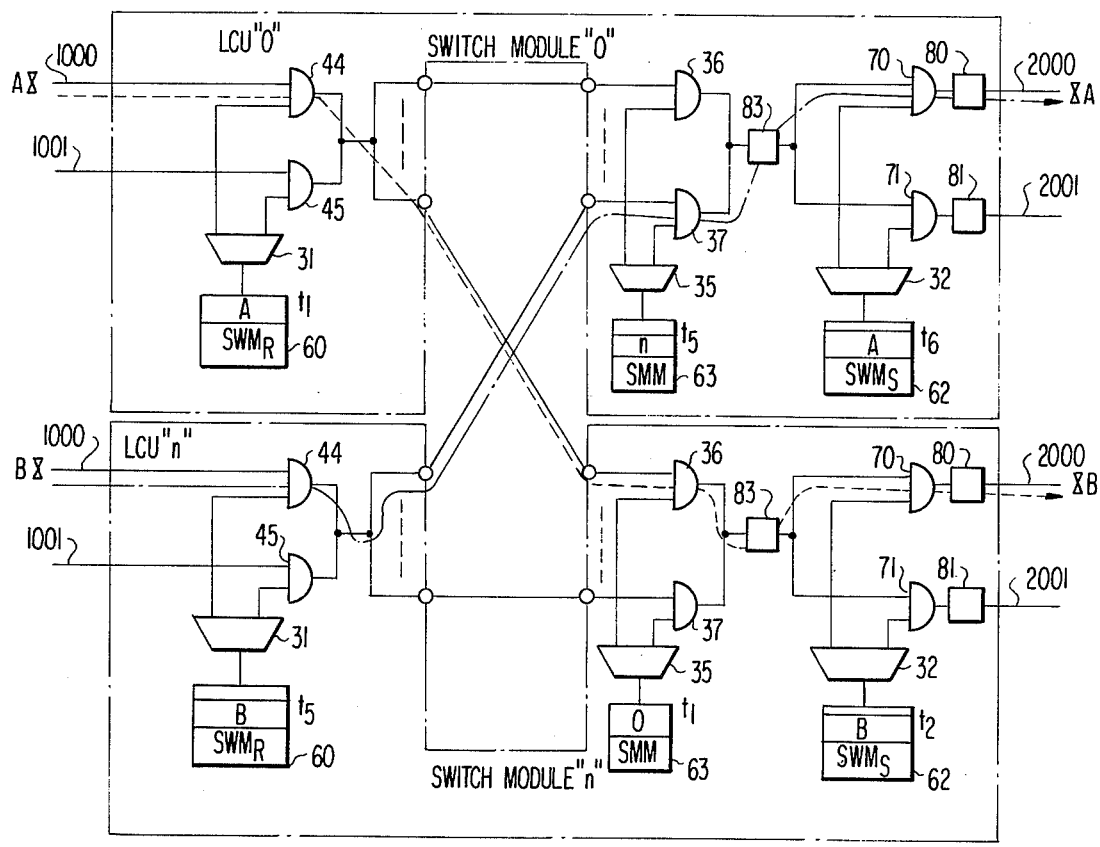
FIG. 5 is a diagrammatic view for explaining the switch operation of the time division switching system shown in FIG. 1.

FIG. 5 shows a mode of connection of input lines and output lines between the terminals A and B, and in this figure is illustrated the case where:

1. in the respective memories 60, 63 and 62 in switch module "0" are written memory 60 → time slot $t_1$ = input line address "A"
 memory 63 → time slot $t_5$ = switch module address "n"
 memory 62 → time slot $t_6$ = output line address "A", while 2. in the respective memories 60, 63 and 62 in switch module "n" are written memory 60 → time slot $t_5$ = input line address "B"
 memory 63 → time slot $t_1$ = switch module address "0"
 memory 62 → time slot $t_2$ = output line address "B"

Accordingly, the communication information from terminal A to terminal B is transmitted in the time slot $t_1$ from the switch module "O" to the flip-flop 83 for absorbing a delay time in the switch module $n$, and in the next time slot $t_2$ it is transmitted to the flip-flop 80 for regenerating an output line level, so that it is transmitted through an output line 2000 of switch module "$n$" as a signal analogous to the information on the input line 1000 of switch module "O", as shown by a dotted line.

On the other hand, the communication information from terminal B to terminal A is transmitted in the time slot $t_5$ from the switch module $n$ to the flip-flop 83 for absorbing a delay time in the switch module O, and in the next time slot $t_6$ it is transmitted to the flip-flop 80 for regenerating an output line level, so that it is transmitted through an output line 2000 of switch module O as a signal analogous to the information on the input line 1000 of switch module $n$, as shown by a double-dot chain line.

Termination of communication is detected by time supervision of the input line level through a procedure similar to the above-described detection of communication demand, and the connection path indicated by said dotted line or double-dot chain line is eliminated by clearing the contents of the respective memories which were written for the connection between said terminals A and B.

What is claimed is:

1. A time division communication system adapted to structural and capacity expansion, comprising: $2n$ switch modules (n is a positive integer) each composed of $m$ line control units ($m$ is a positive integer) for accommodating $m$ lines and a time division switch control unit capable of controlling $2m$ line control units; said switch modules being connected as $n$ switch module pairs each composed of two switch modules with the switch modules of each said switch module pair being provided with cross connections for enabling the respective time division switch control units to be switched over and cross connected for enabling the respective switch modules to mutually send and receive time-division multiplexed information; and the input and output terminals of the corresponding time division switch control units of the respective switch module pairs being interconnected so that the respective ones of said switch module pairs may mutually send and receive said time-division multiplexed information.

2. A time division communication system as recited in claim 1 wherein each of said plurality of line control units comprises: a receiving section and a sending section; said receiving section including first gate means controlled by one of the switch control units of the switch module pair for time-division multiplexing communication information received by said receiving section to the switch control units of the switch module pair; and said sending section including second gate means controlled by one of the switch control units of the switch module pair for multiplexing communication information received from the controlling switch control unit, and means connected between said second gating means and the outputs of said sending section for regenerating one of said outputs.

3. A time-division communication system as recited in claim 2, wherein each of said switch control units comprises: a receiving section and a sending section; said receiving section including means connected to receive time-division multiplexed communication information from the receiving sections of the line control units within the module pair for transmitting said time-division multiplexed communication information to all of said plurality of switch modules, an arithmetic control unit connected to receive communication information from the receiving sections of the line control units within the module pair for generating line state control signals, first memory means connected to said arithmetic control unit for storing said line state control signals, second memory means for storing time-division multiplex signals used to control said first gate means, and write control means connected to said arithmetic control unit for controlling the writing of signals in said first and second memory means; and said sending section including third gate means for selecting time-division multiplexed information from each switch module, third memory means responsive to said write control means for controlling said third gate means, fourth memory means responsive to said write control means for controlling said second gate means, and means connected between said third gate means and the inputs to the sending sections of said plurality of line control units within a module pair for absorbing the signal delay of the time-division multiplexed information.

* * * * *

UNITED STATES PATENT AND TRADEMARK OFFICE
CERTIFICATE OF CORRECTION

PATENT NO. : 4,028,495
DATED : June 7, 1977
INVENTOR(S) : Hiroshi FUNAMO et al

It is certified that error appears in the above-identified patent and that said Letters Patent are hereby corrected as shown below:

Column 2, line 12, delete "4a" and insert --Fig. 4a--;

Column 2, line 14, delete "4b" and insert --Fig. 4b--;

Column 2, line 16, delete "switch" and insert --switching--;

Signed and Sealed this

Twenty-seventh Day of September 1977

[SEAL]

Attest:

RUTH C. MASON
Attesting Officer

LUTRELLE F. PARKER
Acting Commissioner of Patents and Trademarks